Dec. 28, 1965  J. D. RICHARD  3,225,484
AEOLIAN FISH LURE
Filed Feb. 20, 1964
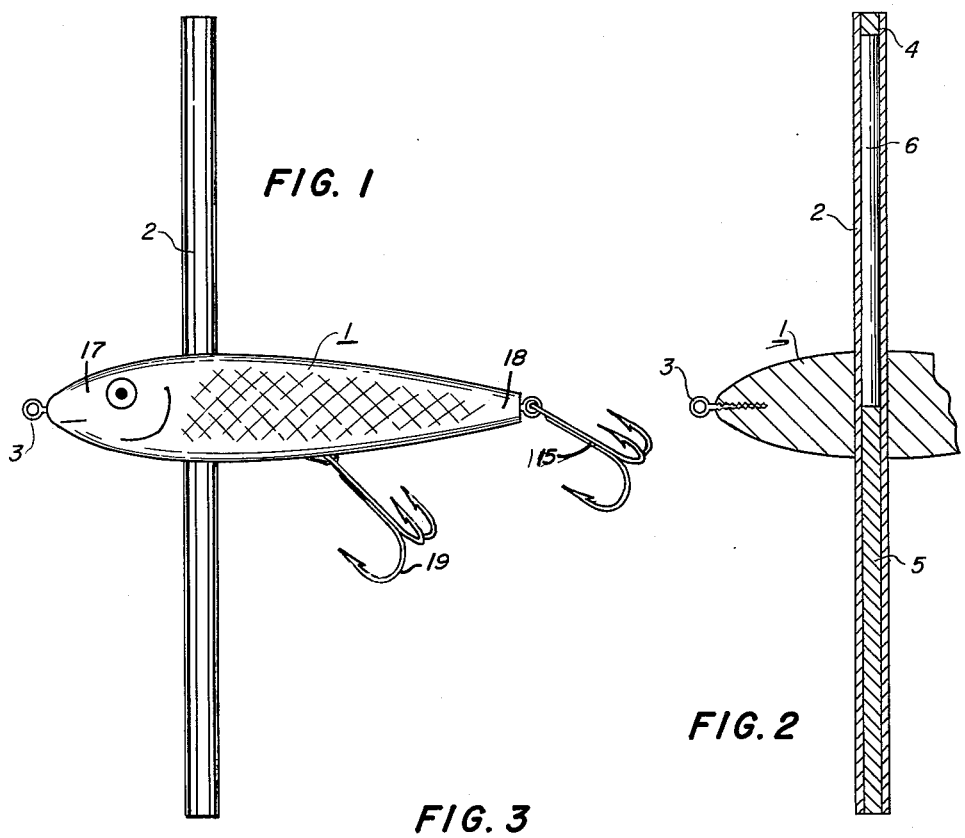
FIG. 1
FIG. 2
FIG. 3
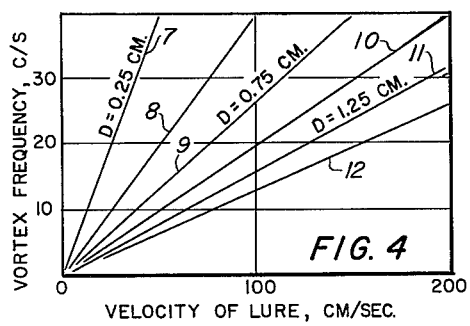
FIG. 4
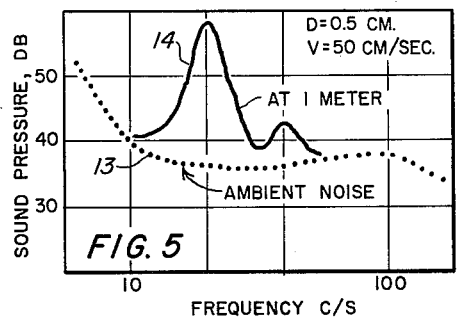
FIG. 5
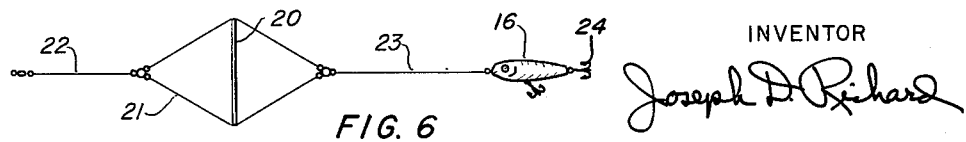
FIG. 6
INVENTOR
Joseph D. Richard

United States Patent Office 3,225,484
Patented Dec. 28, 1965

3,225,484
AEOLIAN FISH LURE
Joseph D. Richard, Miami, Fla.
(531 S. Barrancas Ave., Warrington, Pensacola, Fla.)
Filed Feb. 20, 1964, Ser. No. 346,341
2 Claims. (Cl. 43—17.1)

This invention relates to fishing lures and more particularly to a lure which is adapted to generate low frequency pressure oscillations when pulled through the water.

It is the principal object of the present invention to provide a lure so constructed that its motion relative to the water will set up alternating pressure waves of a character and frequency capable of attracting fish to the lure.

It is a further object to provide a lure capable of radiating pressure fluctuations which is of simple construction and totally without complex moving parts.

It is well known that fish are capable of hearing and responding to a wide range of acoustic signals. Furthermore, it is known that fish are capable of detecting vibratory water particle displacements resulting from various mechanical disturbances such as the movements of other underwater creatures. Most of the pressure fluctuations produced by the swimming movements of fish are in the low frequency range below 100 c./s. Of particular importance is the frequency range 5 c./s. to 50 c./s. which corresponds to the tail movements of fish when frightened or attempting to escape from predators.

The present invention provides a fish lure which hydrodynamically generates a turbulence field similar to that produced by a swimming fish. The frequency and intensity of the turbulent pressure fluctuations are directly proportional to the velocity of the fish lure. A well known hydrodynamic phenomenon is utilized for generating an alternating series of vortices when the lure is pulled through the water. An elongated, substantially rigid cylindrical member, which is integral with or attached to the body of the lure, is disposed and arranged so that its movement through the water is in a direction normal to its major axis. Alternating vortices form behind the moving cylinder and acoustic energy known as "Aeolian tones" is radiated. However, the pressure fluctuations of the turbulence itself have a much greater magnitude than those of the radiated noise.

The phenomenon of Aeolian tones has been known and studied for many years. These tones are emitted by a cylinder when exposed to a transverse moving fluid stream. It was recognized very early that the sound was somehow associated with the periodic shedding of vortices from the cylinder and the concomitant fluctuations of the wake. The frequency of the sound and of the vortex shedding are the same. If an elongated substantially rigid cylinder of diameter D is immersed in a fluid stream of velocity V with the major axis normal to the direction of flow, a seres of vortices are formed and shed periodically into the wake. The frequency of the vortex shedding is approximately proportional to the velocity and inversely proportional to the diameter.

$$\text{Frequency} = 0.2V/D \text{ (approximately)}$$

The wake of the cylinder consists of regularly spaced vortices. The velocity fluctuations in the turbulent wake lead, according to Lighthill's theory, to a field of quadrupole acoustic sources. These radiate wide band noise at a level too low to be of any significance in the present application. In addition, however, Lighthill's theory indicates that the fluctuating stresses at the surface of the cylinder behave as dipole sources which radiate the Aeolian tones. The radiated tone has the same frequency as the wake and it is associated with the alternating lift forces acting on the cylinder. A tone of lower amplitude is produced, having twice the frequency of the wake, which is associated with the fluctuating drag forces. The intensity of these tones increases exponentially with the velocity.

Practical embodiments of the invention are shown in the accompanying drawings wherein:

FIGURE 1 represents a side elevation of a complete lure according to my invention.

FIGURE 2 represents a partial sectional view of the fish lure.

FIGURE 3 shows a top view of the same fish lure.

FIGURE 4 shows the relationship between velocity and vortex frequency for the fish lures for various cylinder diameters.

FIGURE 5 shows the radiated sound pressure for a typical cylindrical element.

FIGURE 6 shows an alternate mode of operation for the present invention wherein the cylindrical element is physically separated from the visually attractive portion of the lure.

In the drawings, the fish lure shown in FIGURES 1, 2, and 3 comprises a body portion 1 having the shape and appearance of a typical fish lure. The body portion 1 comprises a head portion 17 and a tail portion 18. A first gauged set of hooks 15 is attached to the tail portion 18 and a second gauged set of hooks 19 is attached to the ventral surface of the body portion 1. An elongated cylindrical element 2 passes transversely through the body portion 1. The cylindrical element 2 is arranged and disposed so that when the lure is pulled through the water by a line attached to the screw eye 3 the axis of the cylindrical member 2 will be normal to the direction of travel. Periodic vortices are formed and sound is radiated as the cylinder moves transversely through the water. The cylindrical element 2 extends approximately an equal distance above and below the body portion 1. The cylindrical element 2 is constructed of a transparent plastic tube having a short plug section 4 in the upper end and a long plug section 5 in the lower end. The lower half of the cylindrical element 2 is therefore solid and the upper half contains the cavity 6. This preferred construction keeps the fish lure vertically oriented in the water.

FIGURE 4 shows the vortex frequencies generated by cylindrical elements of various diameters ranging from 0.25 cm. to 1.50 cm. for lure velocities of zero to 200 cm./sec. For example, it may be readily seen that a cylindrical element having a diameter of 1.0 cm. will generate alternating vortices at a rate of 20 c./s. when pulled transversely through the water at a velocity of 100 cm./sec.

FIGURE 5 shows the sound pressure radiated by a cylindrical element having a diameter of 0.5 cm. and a length of 15 cm. when pulled transversely through the water at 50 cm./sec. The peak frequency of the radiated sound pressure is 20 c./s. and a much lower peak is apparent at twice the fundamental frequency. The sound pressure refers to decibels above a reference pressure of .0002 dyne/cm.$^2$. The sound pressure of the Aeolian tone is well above the ambient noise at a distance of 1 meter from the fish lure.

FIGURE 6 shows a cylindrical element 20 positioned normal to its direction of travel by the bridle assembly 21 which is towed by the leader 22. A conventional fish lure 16 of any desired type, having a set of hooks 24, is connected to the bridle assembly 21 by means of the leader wire 23.

The length of the cylindrical element does not affect the frequency and is therefore not critical. However, the cylindrical element should be as long as conveniently possible to increase the intensity of the vortices generated. A total length of six inches is considered practical for a small casting lure. The cylindrical element may be made of almost any material but a preferred construction is of transparent "Lucite" so that it is almost invisible underwater and therefore does not detract from the visual appeal of the lure. It is not necessary that the rod element be exactly circular in cross section (cylindrical). An elongated rod having curved surfaces of any geometry will generate vortices when moved transversely through the water. However, a circular cross sectioned rod (cylinder) has proven to be most efficient and predictable and also the easiest to construct.

When trolling or casting artificial lures it is the general practice to cause the lure to move through the water at continually varying speeds ranging from near zero to about 200 cm./sec. For example when plug casting it is the usual practice to move the tip of the rod during retrieval so that it alternately speeds up and slows down the progress of the lure through the water. Under these conditions the Aeolian fish lure will radiate a continually changing frequency depending on its velocity in a manner exactly analogous to the mechanical radiations generated by a swimming fish. As the velocity continuously varies, certain vortex frequencies will be passed where the transverse vibrations are mechanically resonant. At these frequencies the intensity of the radiated sound will be considerably increased momentarily so that fish can be attracted from greater distances than otherwise possible.

Having described and illustrated a preferred construction of the present invention, it should be understood that this is merely an example and that the invention is to be limited only by the scope of the appended claims.

What is claimed is:

1. A fishing lure for generating low frequency pressure fluctuations in a body of water comprising: an elongated substantially solid body member having a head portion and a tail portion, the said body member being of a shape and color which is visually attractive to at least one species of fish; means adjacent the said head portion for attachment of a fishing line to the said body member for pulling the said lure through the water; a plurality of fish hooks attached to the said member adjacent the said tail portion; and an elongated substantially rigid cylindrical element passing vertically through the said body member and projecting a substantially equal distance above and below the said body member, the said cylindrical element being disposed and arranged so that it moves through the water in a direction perpendicular to its major axis when the said lure is pulled through the water and said cylindrical element being completely free above and below the body member and having an axial length greater than the length of the body member.

2. A fish lure for radiating low frequency pressure fluctuations into the water comprising: an elongated body member having at least a superficial resemblance to a small fish, the said body member being thereby visually attractive to larger predator fish; means for attaching a fishing line to one end of the said body member; at least one fish hook attached to the said body member; and an elongated substantially rigid cylindrical element projecting from the said body member, the said cylindrical element being arranged and disposed so that it projects out from the said body member an approximately equal distance on each side of the said body member, the said cylindrical element being positioned so that its major axis is maintained perpendicular to the direction of travel when the said body member is pulled through the water and said cylindrical element being completely free on each side of the body member and having an axial length greater than the length of the body member.

References Cited by the Examiner

UNITED STATES PATENTS

| | | | |
|---|---|---|---|
| D. 183,876 | 11/1958 | Courtright | 43—42.48 X |
| 720,643 | 2/1903 | Wallace | 43—42.74 X |
| 2,201,351 | 5/1940 | Skoverski | 43—43.15 X |
| 2,274,596 | 2/1942 | Fink | 43—42.39 X |
| 2,765,569 | 10/1956 | Claybrook | 43—42.26 |
| 2,787,858 | 4/1957 | Best | 43—43.15 |
| 2,814,901 | 12/1957 | Suiter | 43—42.74 |
| 2,883,786 | 4/1959 | Smith | 43—42.31 X |
| 2,948,079 | 8/1960 | Malchert | 43—42.4 |
| 2,977,705 | 4/1961 | Busnel | 43—17.1 |
| 3,073,054 | 1/1963 | Sherwood | 43—17.1 |
| 3,142,927 | 8/1964 | Stram | 43—42.31 |

FOREIGN PATENTS

| | | |
|---|---|---|
| 1,055,488 | 10/1953 | France. |
| 574,630 | 1/1946 | Great Britain. |
| 5,766 | 11/1897 | Norway. |

SAMUEL KOREN, *Primary Examiner.*